United States Patent [19]

Merbler

[11] 3,895,844

[45] July 22, 1975

[54] ROLLER SKATE WHEELS

[76] Inventor: Rudolph Merbler, 108 Brentwood Ln., Fairport, N.Y. 14450

[22] Filed: May 22, 1974

[21] Appl. No.: 472,008

[52] U.S. Cl............ 301/5.7; 301/63 PW; 301/63 R
[51] Int. Cl.² ............................................. B60B 5/00
[58] Field of Search........... 301/5 R, 5.3, 5.7, 39 R, 301/63 R, 63 PW, 65, 66

[56] References Cited
UNITED STATES PATENTS

| | | | |
|---|---|---|---|
| 2,075,271 | 3/1937 | Coldwell | 301/5.7 |
| 2,878,074 | 3/1959 | Cawl | 301/63 PW |
| 2,978,277 | 4/1961 | Gaudry | 301/63 PW |
| 3,604,756 | 9/1971 | Gruber | 301/63 PW |

*Primary Examiner*—M. Henson Wood, Jr.
*Assistant Examiner*—D. W. Keen
*Attorney, Agent, or Firm*—Martin Lukacher

[57] ABSTRACT

Roller skate wheels are described which combine features of long wear, shock absorption, and smooth running through the use of a relatively hard hub and a relatively soft and replaceable rim around the hub; the hub having one or more circular grooves extending axially inwardly from the ends thereof so as to permit flexure of the outer periphery of the hub in response to forces at the outer edge of the wheel where it contacts the skating floor.

8 Claims, 4 Drawing Figures

PATENTED JUL 22 1975   3,895,844

ROLLER SKATE WHEELS

The present invention relates to wheels which are adapted to be used in roller skates, and particularly to roller apparatus which may be subject to variable loads and shock forces, as are encountered in roller skating applications. By such load is meant pressure applied axially to the outer edges of wheels when leaning from side to side.

The invention is especially suitable for use in the wheel and truck assembly of a roller skate. Features of the invention are generally applicable for use in other roller apparatus where absorption of shocks and smooth running with the maintenance of traction between the roller and the floor are desirable.

Although roller skating for recreation, sport and competition has been practiced for many many years, a wheel which is capable of rolling fast and yet maintaining traction with the floor has long been sought after. In recent skate wheels the wooden construction (see for example U.S. Pat. No. 2,304,944) has been replaced with compositions and plastics. Such wheels are generally made of hard material where fast rolling is desired. But such wheels lack traction which is needed for dance and freestyle skating. For such applications a somewhat softer and abrasive material has been used. Such softer wheels increase the skating effort, they are hard to roll and have a tendency to become deformed.

In skating, as well as in other applications for rollers, intermittent loads are applied to the wheel. This is especially the case during turns where loads having axial as well as radial force components occur. These forces are hard on the feet and ankles of a skater. In addition, it is generally desirable to absorb and not transmit such shock vibrating forces, not only to a person but to any apparatus or mechanism supported by the wheel or roller which encounters such shock forces.

Skate wheels as well as other rollers are also subject to wear. During turns, which in skating may be performed at high rotational speeds, the outer edges of the wheels wear to a greater extent than the inner edges. The wheel eventually becomes tapered and must be ground down or otherwise reshaped to uniform diameter. Eventually the wheel must be replaced. Also skate wheels are generally not reversible and thus can not be rotated so as to provide for more uniform wheel wear.

It is also desirable to reduce the level of noise which is generated during skating and otherwise when apparatus is moved on rollers. Some of this noise is due to slipping and loss of traction on turns, as well as by the rotating wheel impacting against the floor as it picks up dirt and grit.

It is a feature of this invention to provide a roller and especially a skate wheel in which the above-discussed disadvantages are substantially eliminated. Wheels provided in accordance with this invention are adapted to be fast running and yet maintain traction with the floor. They absorb shocks and vibrations yet maintain more uniform weight distribution across the wheel assembly. Slipping or sliding, especially on turns is reduced with a resultant decrease in wear and increase in the operational life of the wheel. As a consequence of the reduction of slipping and sliding, noise levels are reduced.

Reference may be had to the following U.S. Pat. Nos. for further information respecting skate wheel constructions: U.S. Pat. Nos. 1,617,984; 2,254,450; 2,304,944; 2,552,035; 2,697,010; and 3,103,387. Efforts to obtain some of the features afforded by wheels embodying the invention have been directed to bearing and skate frame constructions. Reference may be had to the following United States patents for further information respecting such efforts: U.S. Pat. Nos. 2,039,153; 2,136,531; 2,252,132; 2,722,429; 2,540,487; 2,547,796; 2,595,751; 2,822,182; and 3,087,739.

Accordingly, it is an object of the present invention to provide an improved wheel or roller which is especially adapted for use as a skate wheel.

It is a further object of the present invention to provide an improved wheel or roller having the above-mentioned advantages.

It is still further object of the present invention to provide an improved roller skate wheel which is easy to manufacture, assemble and to install on the truck of a roller skate.

Another object of the present invention is to provide an improved roller skate wheel which permits the tire to be replaced on the wheel hub without removing the wheel from the roller skate.

Briefly described, a roller skate wheel embodying the invention includes a cylindrical body or hub having an axial opening for receiving the axle of a roller skate truck. The hub has a cylindrical groove extending inwardly from one end face thereof a distance sufficient to define a flexural region or web along the outer periphery of the hub. A rim or tire of material which is more resilient that the material constituting the hub may be attached, as by being snap fitted over the outer periphery of the hub. The hub and the rim or tire flexes, as when forces are applied along the edge of the wheel during turns and the like. Under the influence of these forces the web portion flexes, much like a cantilever and the wheel becomes somewhat tapered. The effective diameter of the wheel thus changes. The load and shock forces result in the flexing and are thus absorbed. By virtue of the change in effective diameter and the easing of friction at the outer edges of the wheel due to flexing the drag across the surface of the wheel is reduced thereby counteracting slipping and maintaining uniform traction. The flexing action helps reduce both radial and axial thrust loads on the bearings, thus permitting the wheels to rotate faster.

The foregoing and other objects and advantages of the present invention will become more apparent from a reading of the following description in connection with the accompanying drawings in which.

Figure 1:
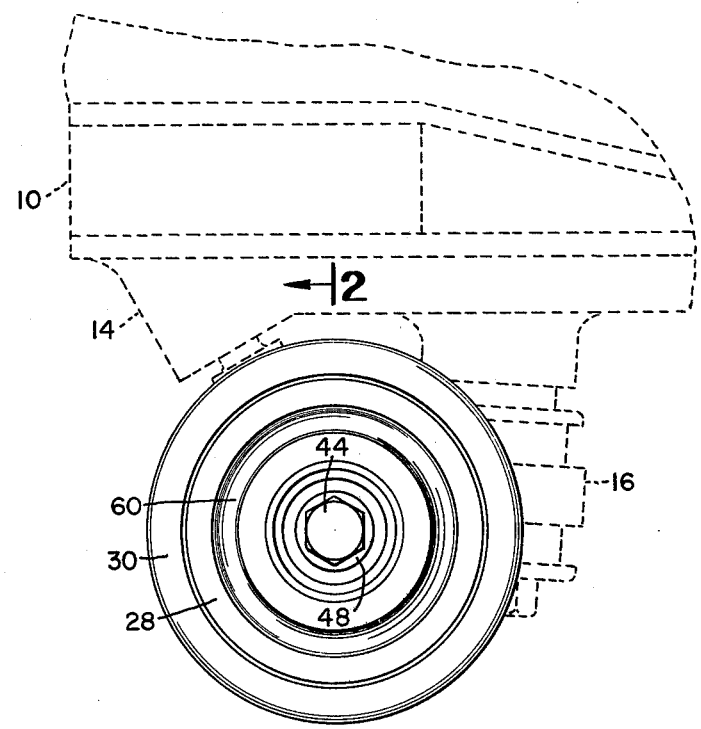
FIG. 1 is a side view showing a roller skate wheel embodying the invention and also showing in dotted lines a portion of the roller skate shoe, frame and truck assembly in which the wheel is mounted.
Figure 2:
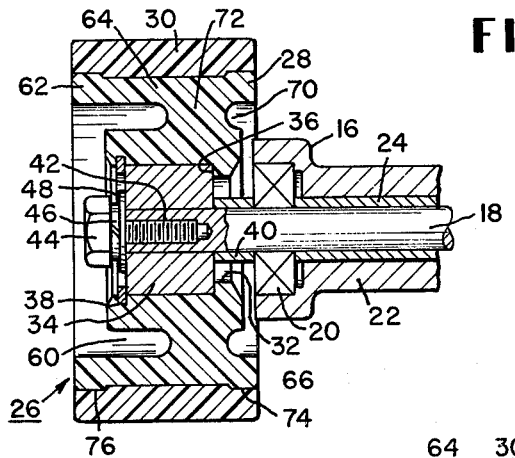
FIG. 2 is a cross-sectional view of the wheel shown in FIG. 1, the view also showing a portion of the truck assembly in which the wheel is mounted and the view being taken along the line 2—2 in FIG. 1.

Referring more particularly to FIG. 1, there is shown a rink type roller skate having a shoe or boot 10 attached to a frame 14 on which a truck assembly 16 is secured. As shown also in FIG. 2 the truck assembly has an axle 18 mounted by ball bearings, one of which 20 is shown, in a housing 22. A bushing or spacer sleeve 24 maintains the bearings in axially spaced relationships. The bearings may be press fitted into the housing such that the outer race is held fixedly in the housing 22 while the inner race holds the axle 18. The axle then rotates independently of the housing. Inasmuch as the inner race, which is of smaller diameter than the outer race, rotates, the velocity of the ball elements in the bearings 20 is reduced. Such reduced velocity reduces bearing vibration, drag and bearing wear and also allows heavier weight lubricants to be used without adverse effect upon bearing speed. The chance of the lubricant being extruded from the bearing is also reduced.

A skate wheel 26 is mounted on the axle. The wheel 26 has a cylindrical body or hub 28 and a tire or rim 30. An axial opening 32 in the hub receives, as by a press fit, a bushing 34. The bushing 34 may be of bronze or other bearing material, an oil bearing bushing material (e.g., the so-called Oilite) material is also suitable. The bushing 34 is maintained axially in the hub 26 between a shoulder 36 and a retaining ring 38. A spacer in the form of a sleeve 40 also maintains the wheel 26 in proper axial alignment with the truck 16.

The end of the axle 18 has an internally threaded hole 42. A screw 44 which extends into the hole 42, with its head flush with or below the end face of the wheel, is tightened against a lock washer 46 and a spacer 48 holds the wheel 26 on the axle 18. No external threads on the axle 18 thus interfere with providing precision tolerances between the inner periphery of the bearing 34 and the outer periphery of the axle 18. Also the wheel axle and bearings may readily be removed, simply by unscrewing the screw 44 and withdrawing the wheel 26 from the axle 18 and then removing the bearings and bushings if necessary, as for cleaning or replacement.

Figure 3:
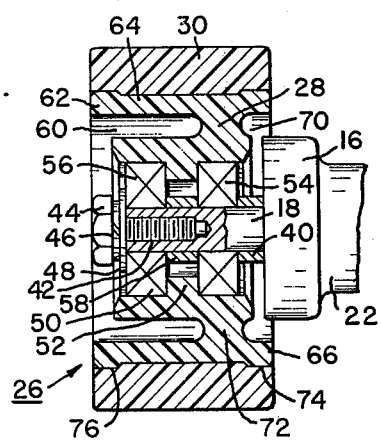
FIG. 3 is a cross sectional view of a roller skate wheel, similar to the wheel shown in FIG. 1, having ball bearings therein.

The wheel shown in FIG. 3 has a similar hub 28 and tire 30. The axial hole 50 in the hub 28 has a central lip 52 which projects radially inwardly. A pair of ball bearings 54 and 56 may be press fitted into the hub and held in axial alignment against opposite sides of the lip 52. A spacer sleeve 58 which bears against the inner races of the bearings 54 and 56 maintains their axial alignment. The axial aignment of the bearings 54 and 56 is also maintained by the spacer 40 and the screw 44, which together with its lock washer and washer arrangement 46 and 48, engage the inner race of the bearing 56 and hold the wheel on the axle 18.

The hub has a circular groove 60 which extends axially inwardly, preferably from the outside end face 62 of the wheel (i.e., the side of the wheel which faces away from the truck 16). This groove is coaxial with the axis of the wheel 26 and therefore with the axis of the axle 18. It extends inwardly a distance sufficient to permit the outer peripheral surface or web 64 to flex about a pivotal region between the inner face 66 of the wheel and the inner or blind end of the groove 60. The axial rim of the groove 60 may suitably be somewhat greater than one-half the width of the wheel 26. For example, the groove may be 0.75 inch in depth for a wheel width of 1.2 inches. The width or radial depth of the groove 60 should be sufficient to allow the wheel to flex into a tapered or somewhat frustroconical shape. For the above-mentioned wheel of 1.2 inch width and 2.375 inch diameter (including the rim or tire 30) a radial depth of approximately 0.160 inch may be suitable.

In addition to the deep groove 60 another groove 70 may extend into the end 66 of the hub 28. The groove 70 is a circular groove which may be of the same diameter as the groove 60. The groove 70 may be of the same radial width as the groove 60, and for the exemplary dimensions given above, may suitably extend a distance of 0.2 inch inwardly from the end 66 of the hub 28. The region 72 between the opposing ends of the grooves 60 and 70 functions as a pivot upon which the web 64 can flex in the manner of a cantilever. The hub may be recessed in its central region (i.e., the cylindrical section of the hub 26 bounded by the grooves 60 and 70). The wheel may then be reversibly mounted on the truck. It is preferable to have the deeper groove 60 on the outside of the skate (viz., the side of the wheel away from the truck 16) as will be explained more fully hereinafter.

The tire or rim 30 is held on the outer periphery of the hub by ridges or shoulders 74 and 76 which enter cooperating recesses along the inner peripheral edges of the rim 30. These shoulders are inwardly tapered, preferably the shoulder 74 and 76 should be higher and less tapered when softer rims 30 are used.

The hub 26 is constructed of relatively hard material while the rims or tires 30 are constructed of relatively soft material. The plastic materials may be used for both the hub and the rim. Preferably the hubs are selected of hard material such as acetal resin which is sold under the trade name "Delrin" by E. I. Dupont DeNemours and Company, Inc., Plastic Department, Wilmington, Del. Other materials such as Nylon and mineral filled Nylon, also available from the Dupont Company, may be used. Another material which may be suitable for use in the hub is a polyamide resin, preferably a polyamide which is reinforced with minerals; the material sold under the trade name "Vydyne-R" by the Monsanto Polymers and Petrochemicals Company, of St. Louis., Mo., being suitable.

The tire or rim 30 is preferably selected from the class of plastic materials having a hardness between Shore D–55 and 60. Where softer tires are used a material having a hardness of 95 Shore A may be used. For general skating a hardness of Shore D–50 is suitable. Polyurethene materials which may be molded or fabricated from tubular polyurethene extrusions may be used for the tires or rims 30.

The combined use of a relatively hard but flexural hub and a relatively soft rim or tire provides improved rolling action, traction and wheel life, as well as vibration and shock absorption features heretofore mentioned. The skater is essentially suspended by the wheels, rather than merely supported, by virtue of the flexural action thereof. These features are especially suitable in roller skating. In skating the skater leans from side to side and applies force at the outer edges of the skate wheel. When such forces are applied to the outer edges of the hereindescribed wheels the wheel flexes and forms an eliptical shape, not only to absorb shocks and pressure but also to relieve wear and reduce sliding. The outer edge of the wheel during outside turns and leaning forms a smaller radius than the inner edge of the wheel. Thus the edge of the wheel which must turn slower is given a smaller radial distance from the center of axle to the skating surface. The bottom of the wheel forms a larger circle, placing more tire on the floor. Slipping is thus minimized and better traction is retained throughout the turn. Furthermore the center of gravity of the skate is lowered at the outer edge of the skate, thus producing a banking or lean of the skater which facilitates the skating action. This reduces fatigue and stress and strain on the skater's legs and ankles. It will be observed also that axial thrusts and forces as well as radial forces are controlled by the flexibility of the hub. The flexing of the hub and tire helps reduce the axial and thrust loads applied to the wheel bearings. The design of the hub is such that the vibration transmitted to the bearings is minimized and allows bearings to turn more freely with less fatigue to the skater. Bearing wear is generally reduced.

Figure 4:
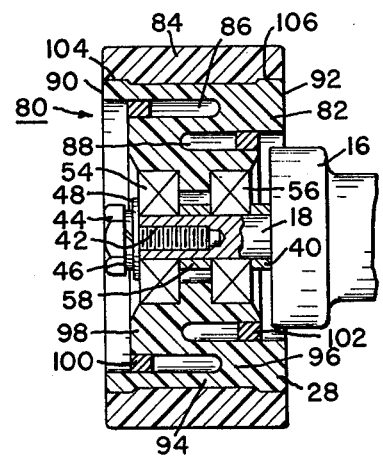
FIG. 4 is a cross-sectional view of a roller skate wheel in accordance with another embodiment of the invention.

Referring to FIG. 4 there is shown a wheel 80. Like the wheel 26, the wheel 80 has a hub 82 and a rim or tire 84. The hub 82 has an axial opening and bearing arrangement whereby it may be assembled on the truck 16 which is similar to that shown in FIG. 3 and like parts of the wheel shown in FIGS. 3 and 4 are indicated by like reference numerals.

The hub 82 has a pair of circular grooves 86 and 88 which are coaxial with the hub 82 and which extend axially inwardly from the opposite ends 90 and 92 of the wheel. Both grooves 86 and 88 are deep grooves and overlap each other. The groove 88 having a smaller diameter than the groove 86. The hub 92 by virtue of the pair of grooves 86 and 88 has double flexing action. The peripheral web 94 of the hub may flex either about an outer peripheral region 96 or an inner peripheral region 98. This double action also provides for axial flexing. In effect, the skate axis (which is held in a pair of wheels mounted on opposite ends of the axle) becomes inclined with respect to the floor. Both radial and axial forces are absorbed by the flexural action of the hub. The wheels may be reversed without any sacrificing of the flexural action. It may be desirable to place resilient rings 100 and 102 (e.g., O-rings) into the grooves 86 and 88 to add additional flexural strength. These rings also assist in keeping the grooves free of dirt.

The rims 84 may be snap fitted on the outer periphery of the hubs and will be held in place by cooperating shoulders and recesses 104 and 106. The additional flexural action afforded by the wheel 80 facilitates the use of harder material for the rim 84. Material such as polyurethene, say having the hardness of Shore D-70 may be used. It will be appreciated that a bushing may be used instead of the ball bearings 54 and 56. In the event that a smaller wheel FIG. 4 is desired, the ball bearings 54 and 56 are replaced by a bushing. Ball bearing fits 54 and 56 are omitted.

From the foregoing description it will be apparent that there has been provided improved rollers and especially improved skate wheels. While embodiment of the wheels as well as descriptions of materials and constructional features thereof have been presented in order to illustrate the presently preferred embodiments and the presently known best mode of practicing the invention, it will be appreciated that variations and modifications of the hereindescribed wheels, within the scope of the invention, will undoubtedly suggest themselves to those skilled in the art. Accordingly, the foregoing description should be taken merely as illustrative and not in any limiting sense.

What is claimed is:

1. A wheel adapted for use in a roller skate having an axle, said wheel comprising
   a cylindrical body having an axial opening for receiving said axle, and said body having a cylindrical groove extending axially inwardly from an end face of said body a distance sufficient to define a flexural web along the outer periphery of said body, a second circular groove extending into said body from the end face thereof opposite to said one end face, said second groove being at the same radial distance from said body axis as said first named groove, and said second groove also being of axial depth smaller than said first groove.

2. The invention as set forth in claim 1 wherein said grooves define a region in said body between the ends of said grooves near the end face of said body opposite to said one end face which region provides a pivotal connection between said web and said body with respect to which said web bends as a cantilever.

3. The invention as set forth in claim 1 wherein said first named groove has a radial width sufficient to permit said body to flex from a cylindrical into a tapered (somewhat frusto-conical) shape with its smaller diameter at said one end face and its larger diameter at the end of said body opposite to said one end whereby to absorb loads when said wheel contacts the skating floor.

4. The invention as set forth in claim 1 wherein said skate has a truck, wherein said axle is rotatably mounted in said truck, and wherein bearing means are provided in said body for rotatably mounting said body on said axle.

5. The invention as set forth in claim 1 wherein said skate has a truck and wherein said end face opposite to said one end face faces said truck.

6. A wheel adapted for use in a roller skate having an axle, said wheel comprising
   a cylindrical body having an axial opening for receiving said axle, and said body having a cylindrical groove extending axially inwardly from an end face of said body a distance sufficient to define a flexural web along the outer periphery of said body, a second circular groove extending into said body from the end face thereof opposite to said one end face, said second groove being of about the same axial depth as said first named groove, and said second groove also being at a lesser radial distance from said body axis than said first groove.

7. The invention as set forth in claim 6 including bushings of material more resilient than said body material disposed in said first and second grooves.

8. A wheel adapted for use in a roller skate having an axle, said wheel comprising
   a cylindrical body having an axial opening for receiving said axle, and said body having a cylindrical groove extending axially inwardly from an end face of said body a distance sufficient to define a flexural web along the outer periphery of said body, said body being a hub of material having a first hardness, a tire of material having a second hardness less than said first hardness mounted around the outer periphery of said hub, and said first material containing acetal resin and said second material containing polyurethene.

* * * * *